(12) United States Patent
Kim (10) Patent No.: US 10,466,401 B2
(45) Date of Patent: Nov. 5, 2019

(54) BACKLIGHT MODULE, METHODS OF MANUFACTURING THE SAME, AND DISPLAY DEVICE

(71) Applicant: BOE TECHNOLOGY GROUP CO., LTD., Beijing (CN)

(72) Inventor: Ki Man Kim, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 197 days.

(21) Appl. No.: 15/515,833

(22) PCT Filed: Sep. 19, 2016

(86) PCT No.: PCT/CN2016/099342
§ 371 (c)(1),
(2) Date: Mar. 30, 2017

(87) PCT Pub. No.: WO2017/118095
PCT Pub. Date: Jul. 13, 2017

(65) Prior Publication Data
US 2018/0046023 A1    Feb. 15, 2018

(30) Foreign Application Priority Data
Jan. 8, 2016   (CN) .......................... 2016 1 0012626

(51) Int. Cl.
*G02F 1/1335* (2006.01)
*F21V 8/00* (2006.01)

(52) U.S. Cl.
CPC ............ *G02B 6/0011* (2013.01); *G02B 6/005* (2013.01); *G02F 1/133504* (2013.01);
(Continued)

(58) Field of Classification Search
CPC . G02B 6/0011; G02B 6/005; G02F 1/133524; G02F 1/133504; G02F 1/133615; G02F 2203/055
See application file for complete search history.

(56) References Cited

U.S. PATENT DOCUMENTS

2009/0262422 A1*  10/2009  Cross .................... G02B 5/305
                                                          359/485.01
2010/0021731 A1*  1/2010   Nomura ................ B32B 37/144
                                                          428/354
(Continued)

FOREIGN PATENT DOCUMENTS

CN      1892341 A      1/2007
CN    102661544 A      5/2009
(Continued)

OTHER PUBLICATIONS

Translation of 106019444A Dec. 2018.*
(Continued)

*Primary Examiner* — Phu Vu
(74) *Attorney, Agent, or Firm* — Dilworth & Barrese, LLP.; Michael J. Musella, Esq.

(57) ABSTRACT

A backlight module, and a manufacturing method thereof, and a display device are provided. The backlight module includes a backlight source, a light guide plate, at least one optical film, and a multilayer coating; the multilayer coating is provided at at least one side of the at least one optical film; the multilayer coating is configured for decreasing light transmittance of at least one given wavelength; the backlight source is provided at a side of the light guide plate, and configured for providing white light, the light guide plate is configured for guiding the white light toward the optical film, and the white light is emitted out after transmitting through the optical film.

18 Claims, 6 Drawing Sheets

(52) U.S. Cl.
CPC .. *G02F 1/133524* (2013.01); *G02F 1/133615* (2013.01); *G02F 2203/055* (2013.01)

(56) References Cited

U.S. PATENT DOCUMENTS

2014/0132889 A1    5/2014  Li
2016/0084761 A1*  3/2016  Rothberg ............. C12Q 1/6874
                                                        506/4

FOREIGN PATENT DOCUMENTS

| CN | 102333642 A | | 1/2012 |
|---|---|---|---|
| CN | 102650706 A | | 8/2012 |
| CN | 102681049 A | | 9/2012 |
| CN | 103017032 A | | 4/2013 |
| CN | 103675989 A | | 3/2014 |
| CN | 105487291 A | | 4/2016 |
| CN | 106019444 A | * | 10/2016 |
| JP | 2003338212 A | | 11/2003 |
| JP | 2009105025 A | | 5/2009 |
| WO | 2010075357 A1 | | 7/2010 |

OTHER PUBLICATIONS

First Chinese Office Action dated Mar. 28, 2018.
Search Report and Written Opinion dated Dec. 1, 2016 from State Intellectual Property Office of the P.R. China.

* cited by examiner

| 1 | SiO2 | 73.59 |
| 2 | TiO2 | 96.29 |
| 3 | SiO2 | 20.04 |
| 4 | TiO2 | 11.85 |
| 5 | SiO2 | 180.39 |
| 6 | TiO2 | 11.97 |
| 7 | SiO2 | 203.09 |
| 8 | TiO2 | 26.51 |
| 9 | SiO2 | 41.04 |
| 10 | TiO2 | 21.87 |
| 11 | SiO2 | 216.40 |
| 12 | TiO2 | 19.04 |
| 13 | SiO2 | 45.82 |
| 14 | TiO2 | 14.64 |
| 15 | SiO2 | 125.58 |

Fig. 4a

| 1 | SiO2 | 71.17 |
| 2 | TiO2 | 92.80 |
| 3 | SiO2 | 14.88 |
| 4 | TiO2 | 23.67 |
| 5 | SiO2 | 42.76 |
| 6 | TiO2 | 21.54 |
| 7 | SiO2 | 35.12 |
| 8 | TiO2 | 118.53 |
| 9 | SiO2 | 12.70 |
| 10 | TiO2 | 112.85 |
| 11 | SiO2 | 30.62 |
| 12 | TiO2 | 15.42 |
| 13 | SiO2 | 220.87 |
| 14 | TiO2 | 9.26 |
| 15 | SiO2 | 206.27 |
| 16 | TiO2 | 8.91 |

BACKLIGHT MODULE, METHODS OF MANUFACTURING THE SAME, AND DISPLAY DEVICE

TECHNICAL FIELD

Embodiments of the present disclosure relate to a backlight module, and a manufacturing method thereof, and a display device.

BACKGROUND

With the development of the ultra-thin liquid crystal display device, a backlight module normally adopts glass as the material of a light guide plate to maintain the mechanical strength of a liquid crystal display module at present. Glass is relatively suitable to function as the material of the light guide plate because of its characteristics such as high transparency, high mechanical strength, and convenient ink pattern transferring capability or the like. However, in the case of glass being used as the material of a light guide plate, the absorbance of the glass with respect to blue light, which is located at the short wavelength range, is higher than organic glass, which is the another kind of material for the light guide plate, because of the material properties of glass; the longer the propagation distance in a glass light guide plate of the white light emitted from a backlight source is, the more blue light is absorbed, thereby the problem that the color of the back light turns to yellow can be caused. The problem can become even severer for a large-sized display device, whereby the color of the back light provided by the backlight source can become inhomogeneous due to different positions, and therefore the quality of the displayed image can be adversely impacted.

Therefore, it is a critical problem for those skilled in art to ameliorate the problem that the color of the back light turns to yellow because blue light is absorbed by a light guide plate, and the display effect is adversely impacted.

SUMMARY

Embodiments of the present disclosure provide a backlight module, and a manufacturing method thereof, and a display device, so as to solve the problem that the color of a back light of the display device deviates to yellow because the blue light is absorbed by the light guide plate, and the display effect of the display device is adversely impacted.

At least one embodiment of the present disclosure provides a backlight module, which comprises: a backlight source, a light guide plate, at least one optical film, and a multilayer coating; wherein the multilayer coating is provided at at least one side of the at least one optical film; the multilayer coating is configured for decreasing light transmittance of at least one given wavelength; the backlight source is provided at a side of the light guide plate, and configured for providing white light, the light guide plate is configured for guiding the white light toward the optical film, and the white light is emitted out after transmitting through the optical film.

For example, for the backlight module provided by an embodiment of the present disclosure, a material of the light guide plate is glass and the multilayer coating is configured for decreasing transmittance of yellow light.

For example, for the backlight module provided by an embodiment of the present disclosure, the multilayer coating is configured for gradually decreasing the transmittance of yellow light in a direction, which is away from the backlight source, along the light guide plate.

For example, for the backlight module provided by an embodiment of the present disclosure, the at least one optical film comprises one or more of a diffuser film, a prism film or a reflective polarizer.

For example, for the backlight module provided by an embodiment of the present disclosure, the optical film comprises a diffuser film, the diffuser film is provided at a light-emitting side of the light guide plate, and the multilayer coating is provided at a light-incident side of the diffuser film.

For example, for the backlight module provided by an embodiment of the present disclosure, the optical film further comprises a prism film, the prism film is provided at a light-emitting side of the diffuser film, and the multilayer coating is provided at a light-incident side of the prism film.

For example, for the backlight module provided by an embodiment of the present disclosure, the number of prism film becomes two, the prism film, which is close to the diffuser film, is a first prism film, and the other prism film is a second prism film, the multilayer coating is provided at the light-incident side of each prism film.

For example, for the backlight module provided by an embodiment of the present disclosure, the optical film further comprises a reflective polarizer, the reflective polarizer is provided at the light-emitting side of the second prism film, and the multilayer coating is provided at the light-incident side and/or the light-emitting side of the reflective polarizer.

For example, for the backlight module provided by an embodiment of the present disclosure, the multilayer coating comprises a plurality of silicon dioxide layers and a plurality of titanium dioxide layers, the plurality of silicon dioxide layers and the plurality of titanium dioxide layers are alternately provided.

For example, for the backlight module provided by an embodiment of the present disclosure, a thickness of the multilayer coating is gradually increased in a direction, which is away from the backlight source, along the light guide plate.

At least one embodiment of the present disclosure further provides a method of manufacturing a backlight module, which comprises: providing a backlight source, a light guide plate, and at least one optical film; forming a multilayer coating at at least one side of the at least one optical film; wherein the multilayer coating is configured for decreasing light transmittance of at least one given wavelength; the backlight source is provided at a side of the light guide plate, and configured for providing white light, the light guide plate is configured for guiding the white light toward the optical film, and the white light is emitted out after transmitting through the optical film.

For example, for the method of manufacturing the backlight module provided by an embodiment of the present disclosure, the multilayer coating is configured for decreasing transmittance of yellow light.

For example, for the method of manufacturing the backlight module provided by an embodiment of the present disclosure, the multilayer coating comprises a plurality of silicon dioxide layers and a plurality of titanium dioxide layers.

For example, for the method of manufacturing the backlight module provided by an embodiment of the present disclosure, forming of the multilayer coating at at least one side of the at least one optical film comprises: alternately forming the plurality of silicon dioxide layers and the plurality of titanium dioxide layers at at least one side of the at least one optical film through a laminating process.

For example, for the method of manufacturing the backlight module provided by an embodiment of the present disclosure, the laminating process is a thermal evaporation process under vacuum.

For example, for the method of manufacturing the backlight module provided by an embodiment of the present disclosure, a pressure of the thermal evaporation process is $10^{-6}$-$10^{-7}$Pa; a temperature for thermally evaporating silicon dioxide is higher than 150☐; and a temperature for thermally evaporating titanium dioxide is higher than 350☐.

For example, for the method of manufacturing the backlight module provided by an embodiment of the present disclosure, the temperature for thermally evaporating silicon dioxide is from 150☐-300☐; and the temperature for thermally evaporating titanium dioxide is from 350☐-500☐.

At least one embodiment of the present disclosure further provides a display device, which comprises any one of the above backlight modules, and a liquid crystal display panel, wherein, the backlight module is configured for providing back light for the liquid crystal display panel for display.

For example, for the display device provided by an embodiment of the present disclosure, further comprises a lower polarizer and an upper polarizer respectively provided at a light-incident side and a light-emitting side of the display panel, wherein the multilayer coating layer is provided at a light-incident side of the lower polarizer.

BRIEF DESCRIPTION OF THE DRAWINGS

In order to clearly illustrate the technical solution of the embodiments of the disclosure or the prior art, the drawings of the embodiments or the drawings used to describe the prior art will be briefly described in the following; it is obvious that the described drawings in the following are only related to some embodiments of the disclosure, those skilled in the art can obtain other drawings based on the above drawings without any inventive work.

DETAILED DESCRIPTION

The concrete implementation methods of a backlight module, and a manufacturing method thereof, and a display device provided by an embodiment of the present disclosure will be described in detail with reference to the drawings.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
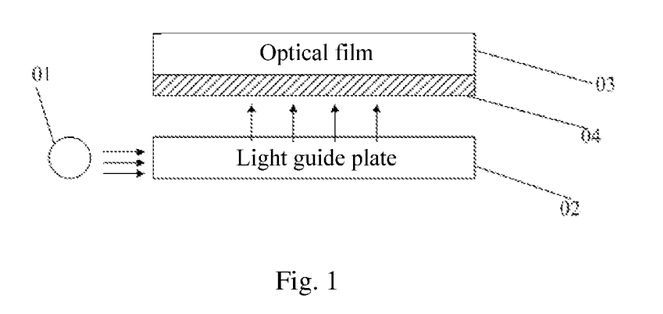
FIG. 1-FIG. 3 are respectively schematically structural views of a backlight module provided by an embodiment of the present disclosure.

An embodiment of the present disclosure provides a backlight module, as illustrated in FIG. 1, the backlight module includes a backlight source 01, a light guide plate 02, at least one optical film 03, and a multilayer coating 04. At least one side of the at least one optical film 03 is provided with the multilayer coating 04; the multilayer coating 04 is configured for decreasing the light transmittance of at least one given wavelength; the backlight source 01 is provided at a side of the light guide plate 02, and configured for providing white light, the light guide plate 02 is configured for guiding the white light toward the optical film 03, and the white light is emitted out after transmitting through the optical film 03.

For the backlight module provided by the embodiment of the present disclosure, the light transmittance of the at least one given wavelength can be decreased through providing a multilayer coating at at least one side of any optical film of the backlight module, for example, for example, the transmittance of kinds of yellow light in the back light can be decreased, the problem that the overall color of the back light turns to yellow because blue light is overly-absorbed as the increasing of the propagation distance of the back light in a light guide plate can be avoided, the color of the back light can become homogeneous, and the overall display effect of the display device can be improved accordingly.

For example, in the case that the material of the light guide plate is glass, the light emitted by the backlight source is guided toward the optical film by the light guide plate, the blue light in the back light can be overly-absorbed as the increasing of the propagation distance of the back light in the light guide plate, thereby the color of the back light emitted out becomes inhomogeneous. The transmittance of yellow light can be decreased by the multilayer coating, therefore, at least one side of any one of the optical films of the backlight module can be provided with the multilayer coating, and the problem that the overall color of the back light deviates to yellow because the blue light is overly-absorbed as the increasing of the propagation distance of the back light in the light guide plate can be avoided.

For the backlight module provided by an embodiment of the present disclosure, the multilayer coating is configured for gradually decreasing the transmittance of yellow light along the direction, which is away from the backlight source, along the light guide plate. The absorbed blue light is increased with the increasing of the propagation distance of the back light in the light guide plate, and therefore the overall color of the back light deviates to yellow. Therefore, for the backlight module provided by the embodiment of the present disclosure, the multilayer coating provided on the optical film can gradually decrease the transmittance of yellow light along the direction, which is away from the backlight source, along the light guide plate, therefore, the blue light and the yellow light in the back light emitted from the backlight source can be balanced and the color of the back light can become homogeneous.

Figure 2:
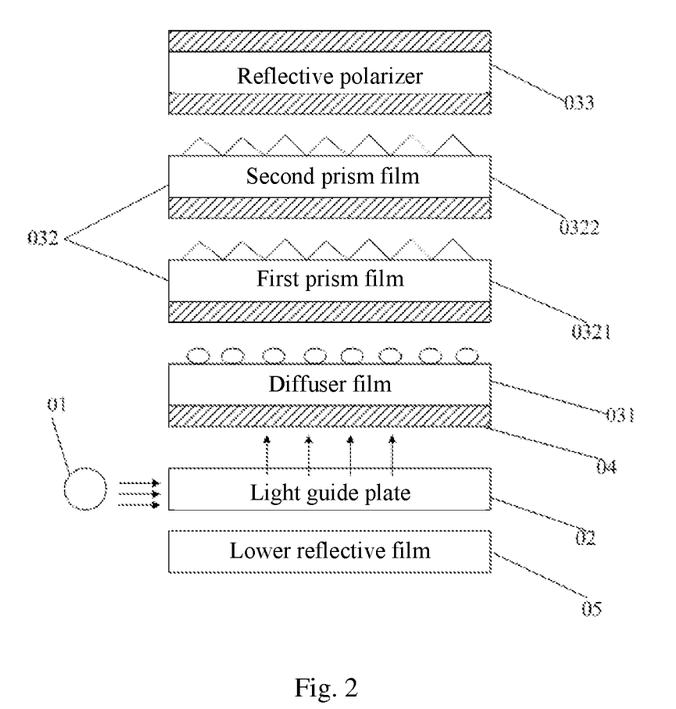

For example, for the backlight module provided by the embodiment of the present disclosure, the at least one optical film can include one or more of a diffuser film, a prism film or a reflective polarizer. The back light is emitted out after passing through each of optical films, and provides the light for performing the display function of the display device. In addition, as illustrated in FIG. 2, the backlight module can further include a lower reflective layer 05 provided at the side of the light-emitting side opposite to the light guide plate, the lower reflective layer 05 is configured for reflecting the light emitted by the backlight source toward the light guide plate 02. The structure and function of each of optical films can refer to conventional technology; no further redundant description will be given herein.

For the backlight module provided by an embodiment of the present disclosure, as illustrated in FIG. 2, the optical films can include a diffuser film 031, the diffuser film 031 is provided at a light-emitting side of the light guide plate 02, a multilayer coating 04 can provided at the light-incident side of the diffuser film 031. For example, the multilayer coating can be provided at the light-incident side of the diffuser film 031 to decrease the transmittance of yellow light in the back light. The back light is emitted out after transmitting through the light guide plate, and then the back light is transmitting through the multilayer coating provided at the light-incident side of the diffuser film, and thereby the transmittance of the yellow light can be decreased, and the multilayer coating can gradually decrease the transmittance of yellow light along the direction, which is away from the backlight source, along the light guide plate, that is, the transmittance of yellow light is decreased along the direction, which is away from the backlight source, along the light guide plate, the balance between yellow light and blue light, the absorbance of which is increased with the increasing of the propagation distance of the back light in the light guide plate, can be achieved, and therefore the color inhomogeneous problem, which is caused because the blue light is partially absorbed, of the back light can be avoided.

For example, for the backlight module provided by an embodiment of the present disclosure, as illustrated in FIG. 2, the optical films can further include a prism film 032; the prism film 032 is provided at the light-emitting side of the diffuser film 031, and a multilayer coating 04 can provided at the light-incident side of the prism film 032. For example, a multilayer coating can provided at the light-incident side of the prism film 032, thereby the back light is guided toward the optical film after transmitting through the light guide plate, and the back light can transmit through the multilayer coating provided at the light-incident side of the prism film, the multilayer coating can decrease the transmittance of yellow light, and the multilayer coating can gradually decrease the transmittance of yellow light along the direction, which is away from the backlight source, along the light guide plate, that is, the transmittance of yellow light is decreased along the direction, which is away from the backlight source, along the light guide plate, the balance between yellow light and blue light, the absorbance of which is increased with the increasing of the propagation distance of the back light in the light guide plate, can be achieved, and therefore the color inhomogeneous problem, which is caused because the blue light is partially absorbed, of the back light can be avoided.

For example, for the backlight module provided by an embodiment of the present disclosure, as illustrated in FIG. 2, the number of prism films can be two, that is, two adjacent prism films can be provided in the backlight module, the prism film, which is close to the diffuser film 031, is a first prism film 0321, and the other prism film is a second prism film 0322; a multilayer coating 04 can be provided at the light-incident side of each prism film. For example, two adjacent prism films can be provided in the backlight module provided by the embodiment of the present disclosure, and a multilayer coating can be provided at the light-incident side of each prism film, thereby the back light is guided toward the optical film by the light guide plate, the back light can transmit through the multilayer coating provided at the light-incident side of each prism film, the multilayer coating can decrease the transmittance of yellow light, and the multilayer coating can gradually decrease the transmittance of yellow light along the direction, which is away from the backlight source, along the light guide plate, and therefore the color inhomogeneous problem, which is caused because the blue light is partially absorbed, of the back light can be avoided.

For example, for the backlight module provided by an embodiment of the present disclosure, as illustrated in FIG. 2, the optical films can further include a reflective polarizer 033; the reflective polarizer 033 is provided at the light-emitting side of the second prism film 0322, a multilayer coating 04 can be provided at the light-incident side and/or the light-emitting side of the reflective polarizer 033. For example, for the backlight module provided by the embodiment of the present disclosure, the optical film can further include a reflective polarizer, a multilayer coating can be provided at the light-incident side and/or the light-emitting side of the reflective polarizer to decrease the transmittance of yellow light in the back light. The back light is guided toward the optical film by the light guide plate; the transmittance of yellow light can be decreased by the multilayer coating provided at the light-incident side of the reflective polarizer, and also the transmittance of the yellow light can be decreased by the multilayer coating provided at the light-emitting side of the reflective polarizer; the multilayer coating can gradually decrease the transmittance of the yellow light along the direction, which is away from the backlight source, along the light guide plate, that is, the transmittance of the yellow light is decreased along the direction, which is away from the backlight source, along the light guide plate, the balance between yellow light and blue light, the absorbance of which is increased with the increasing of the propagation distance of the back light in the light guide plate, can be achieved, and therefore the color inhomogeneous problem, which is caused because the blue light is partially absorbed, of the back light can be avoided.

It should be understand that the optical film(s) provided by the embodiment of the present disclosure can only include any one of the diffuser film, the prism film and the reflective polarizer, or the optical film(s) can only include any two of the above films, relevant descriptions can be referred to conventional technologies, no further redundant description will be given herein.

For example, for the backlight module provided by an embodiment of the present disclosure, the multilayer coating can include a plurality of silicon dioxide layers and a plurality of titanium dioxide layers, and the plurality of silicon dioxide layers and the plurality of titanium dioxide layers are alternately stacked. For example, for the backlight module provided by an embodiment of the present disclosure, the multilayer coating includes the plurality of silicon dioxide layers and the plurality of titanium dioxide layers provided alternately; the refractive index of the silicon dioxide at the wavelength of 510 nm is 1.462, and the refractive index of the titanium dioxide at the wavelength of 510 nm is 2.349; the multilayer coating is formed through providing the silicon dioxide layers and the titanium dioxide layers alternately, and the transmittance of yellow light (the wavelength of yellow light is 575 nm) in the back light can be decreased because the multilayer coating is provided at at least one side of any optical film of the backlight module.

For example, for the backlight module provided by an embodiment of the present disclosure, the thickness of the multilayer coating is increased along the direction, which is away from the backlight source, along the light guide plate. The transmittance of yellow light is decreased as the increasing of the thickness of the multilayer coating; because the absorbed blue light is increased as the increasing of the propagation distance in the light guide plate, the thickness of the multilayer coating can be gradually increased along the direction, which is away from the backlight source, along the light guide plate, thereby the transmittance of the yellow light in the back light can be gradually decreased along the direction, which is away from the backlight source, along the light guide plate, thereby the color of the back light can become homogeneous after the back light passes through the multilayer coating(s).

The backlight module provided by an embodiment of the present disclosure will be described with reference to the following embodiment.

Figure 3:
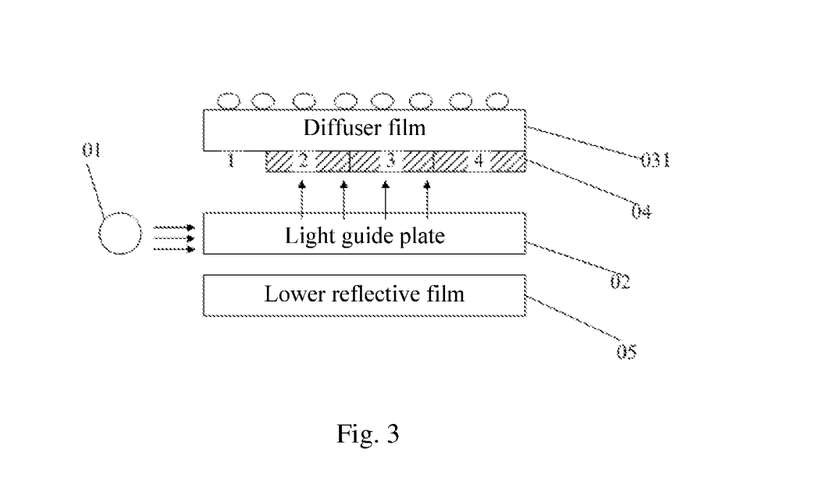
Figure 4A:
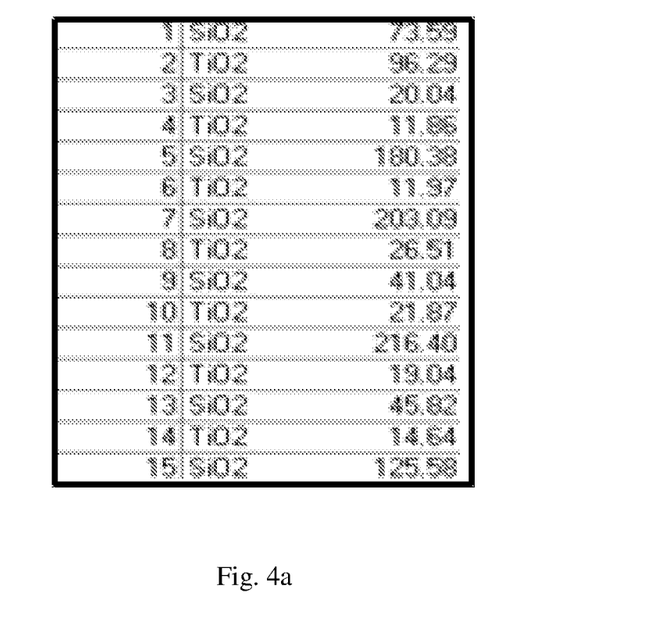
FIG. 4a-FIG. 4c are respectively schematically structural views of the film configuration of four regions of a multilayer coating provided by an embodiment of the present disclosure.
Figure 4B:
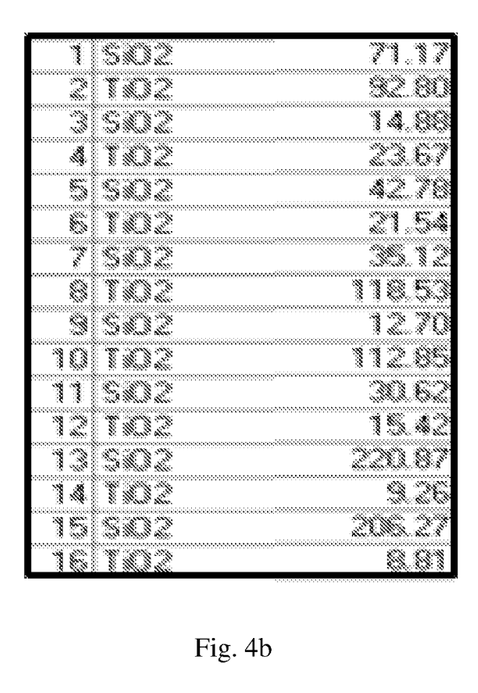
Figure 4C:
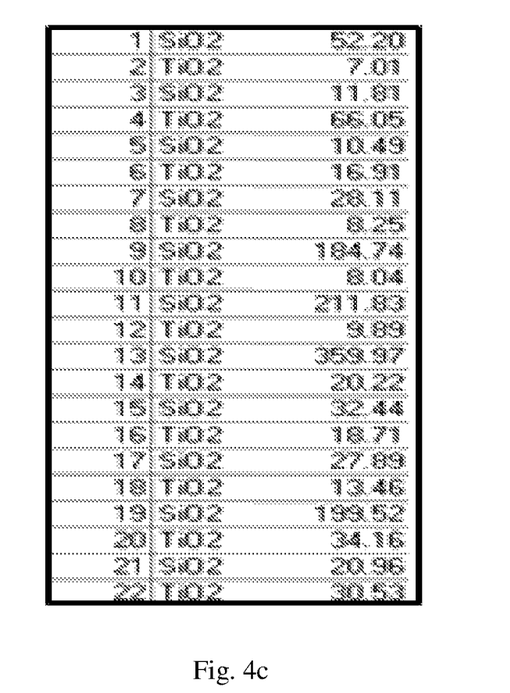
Figure 5A:
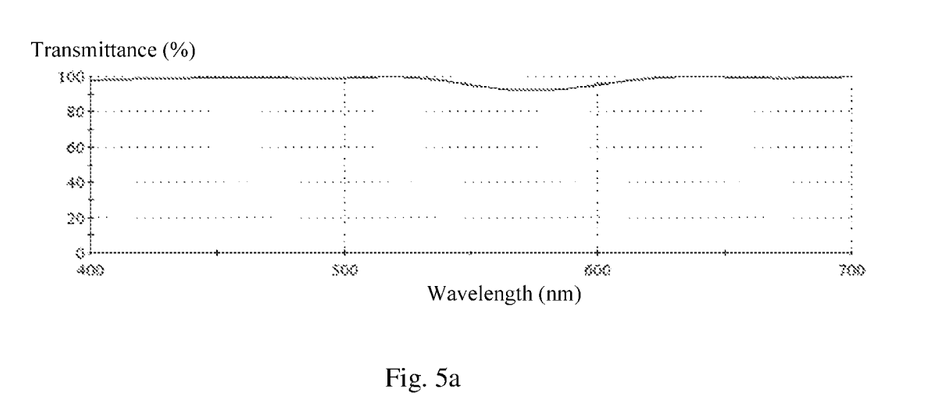
FIG. 5a-FIG. 5c are respectively schematic diagrams of light transmittance curve of the multilayer coatings provided by an embodiment of the present disclosure.
Figure 5B:
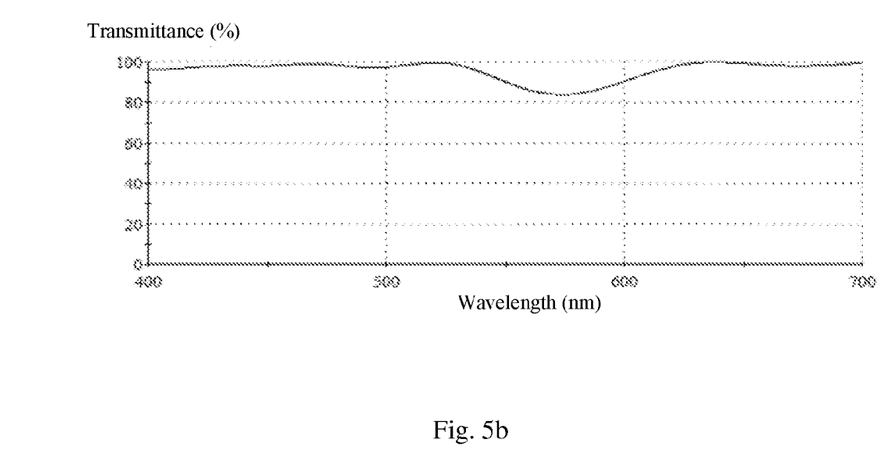
Figure 5C:
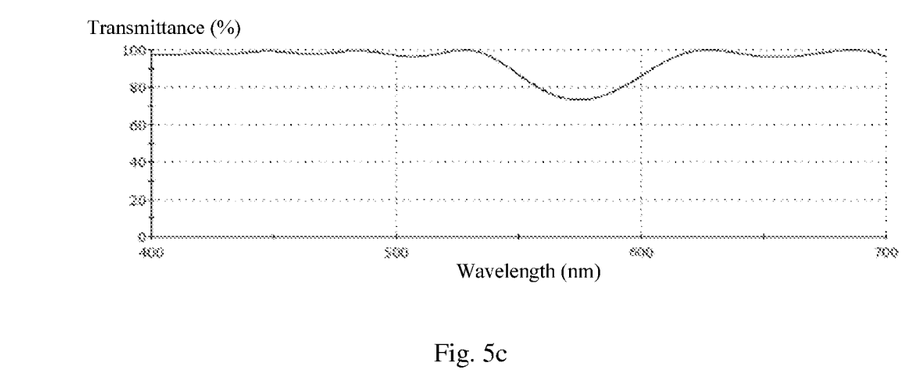

For example, the multilayer coating is provided at the light-incident side of the diffuser film, for example, the multilayer coating can be divided into a plurality of regions in the direction, which is away from the backlight source, along the light guide plate, as illustrated in FIG. 3, the multilayer coating can be divided according to a first region, a second region, a third region, and a fourth region, the first region can be provided without the multilayer coating, the multilayer coatings provided in the second region, the third region, and the fourth region have the transmittance of 90%, 80%, and 70% for yellow light in the regions, respectively; the structures of the multilayer coating in the second region, the third region, and the fourth region are illustrated in FIG. 4a, FIG. 4b, and FIG. 4c, respectively (as illustrated in FIG. 4a, FIG. 4b, and FIG. 4c, the bottom layer of the multilayer structures is near to the diffuser film, and the top layer thereof is near to the light guide plate, respectively). The silicon dioxide $SiO_2$ layers and the titanium dioxide $TiO_2$ layers are alternately provided, the multilayer coating provided in the second region has 15 layers in total, the multilayer coating provided in the third region has 16 layers in total, the multilayer coating provided in the fourth region has 22 layers in total, and the number of layers in each region and the thickness of each layer can be obtained through numerical analysis. As illustrated in FIG. 4a, to realize the transmittance of 90% for yellow light, the structure of the multilayer coating includes a 15-layer structure with the silicon dioxide layers and the titanium dioxide layers being provided alternately, the thickness of each layer is illustrated in FIG. 4a, and the unit of the thickness is nanometer; in practical operations, with the optical modeling of the multilayer coating, the light transmittance of the multilayer coating structure as illustrated in FIG. 4a is illustrated in FIG. 5a, the light transmittance of the multilayer coating structure as illustrated in FIG. 4b is illustrated in FIG. 5b, the light transmittance of the multilayer coating structure as illustrated in FIG. 4c is illustrated in FIG. 5c, and it can be seen that the transmittance of yellow light for the multilayer coating structures as illustrated in FIG. 4a, FIG. 4b, and FIG. 4c are 90%, 80%, and 70%, respectively.

It should be understand that the above embodiments only illustrate the implementation mode of providing a multilayer coating at the light-incident side of a diffuser film, and dividing the multilayer coating into four regions is only for exemplary description, in practical application, the multilayer coating can be arbitrarily divided into a plurality of regions and the size of each region can be provided according to requirements and process conditions, so as to allow the transmittance of the multilayer coating for yellow light to be gradually decreased in the direction, which is away from the backlight source, along the light guide plate. Obviously, the multilayer coating can be provided without the divided regions, and the present disclosure will be not limited thereto.

Based on the same inventive concept, an embodiment of the present disclosure further provides a method of manufacturing a backlight module, which includes: providing a backlight source, a light guide plate, and at least one optical film; forming a multilayer coating at at least one side of the at least one optical film; the multilayer coating is configured for decreasing the light transmittance of at least one given wavelength; the backlight source is provided at a side of the light guide plate, and configured for providing white light, the light guide plate is configured for guiding the white light toward the optical film, and the white light is emitted out after transmitting through the optical film.

For example, the light transmittance of at least one given wavelength (for example, yellow light) can be decreased through providing a multilayer coating at at least one side of each optical film of the backlight module, the problem that the overall color of back light deviates to yellow because the blue light is overly-absorbed as the increasing of the propagation distance of the back light in the light guide plate can be avoided, the color of the back light can become homogeneous, and the overall display effect of the display device can be improved accordingly.

For example, for the method of manufacturing the backlight module provided by an embodiment of the present disclosure, forming of the multilayer coating at at least one side of the at least one optical film can include: alternately forming a plurality of silicon dioxide layers and a plurality of titanium dioxide layers at at least one side of the at least one optical film through a laminating process. For example, for the method of manufacturing the backlight module provided by the embodiment of the present disclosure, the plurality of silicon dioxide layers and the plurality of titanium dioxide layers comprised in the multilayer coating can be provided alternately through a laminating process. The laminating process is a thermal evaporation process under a vacuum condition; the adopted pressure for the thermal evaporation process is $10^{-6}$-$10^{-7}$ Pa; a temperature for thermally evaporating silicon dioxide is higher than 150□; a temperature for thermally evaporating titanium dioxide is higher than 350□. For example, the temperature for thermally evaporating silicon dioxide is 150□-300□, for example, the temperature is 150□, 200□ or 300□; the temperature for thermally evaporating titanium dioxide is 350□-500□, for example, the temperature is 350□, 400□ or 500□. The multilayer coating formed through applying the laminating process with silicon dioxide and titanium dioxide can decrease the transmittance of yellow light, and the color-cast issue of the back light can be ameliorated and the color of the back light can become homogeneous when the multilayer coating is applied into the backlight module.

Based on the same inventive concept, an embodiment of the present disclosure further provides a display device, which includes any one of the above backlight modules provided by the embodiments of the present disclosure, and a liquid crystal display panel; the backlight module is configured for providing back light for the liquid crystal display panel for display. The inhomogeneous color issues of back light can be solved and the display effect can be improved through providing back light for the liquid crystal display panel with the above backlight module provided by the embodiment of the present disclosure. In addition, the display device provided by the embodiment of the present disclosure can apply in any product or device that has display function, such as a cell phone, a tablet computer, a television, a display screen, a laptop, a digital photo frame, a navigator or the like. Because the principle to solve the problem of the display device is similar to that of the backlight module, the implementation method of the display device can refer to the implementation method of the backlight module, no further redundant description will be given for the similar contents.

Figure 6:
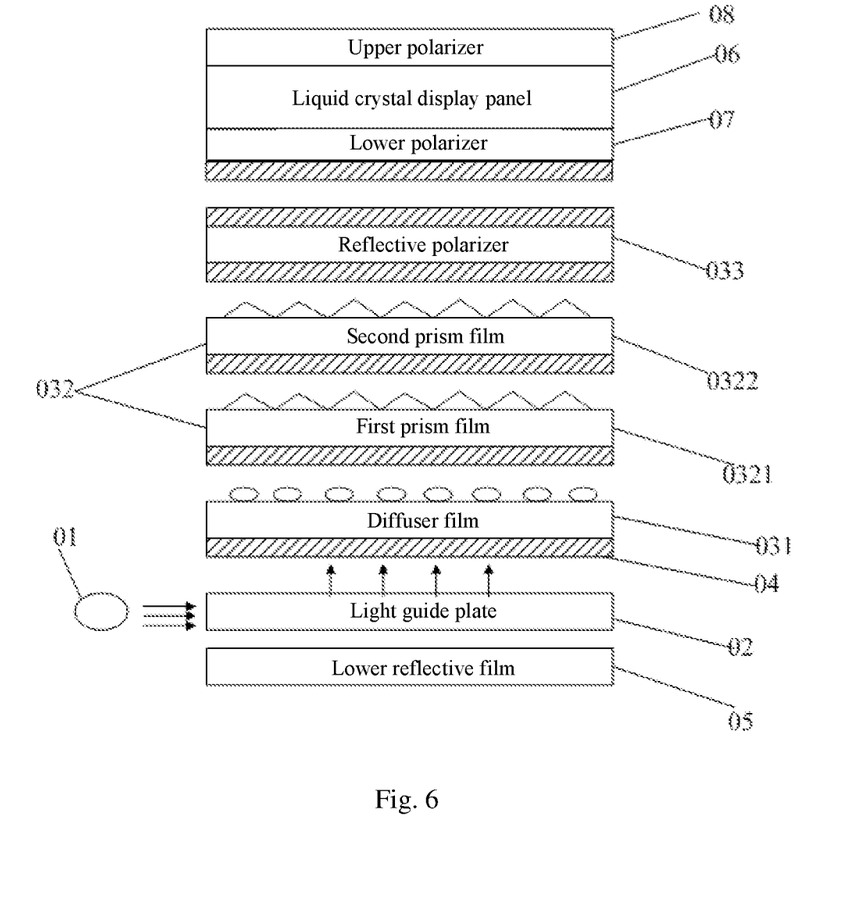
FIG. 6 is a schematically structural view of a display device provided by an embodiment of the present disclosure.

For a possible implementation method, as illustrated in FIG. 6, the above display device provided by an embodiment of the present disclosure can further include a lower polarizer 07 and an upper polarizer 08 respectively provided at a light-incident side and a light-emitting side of the display panel 06, and a multilayer coating 04 is provided at the light-incident side of the lower polarizer 07. For example, for the above display device provided by the embodiment of the present disclosure, the upper polarizer and the lower polarizer respectively provided at the light-emitting side and the light-incident side of the display panel, the structure and function of the upper polarizer and the lower polarizer are the same as those in a conventional technology, and no further redundant description will be given herein. A multilayer coating layer can be provided at the light-incident side of the lower polarizer, and the multilayer coating layer provided at the light-incident side of the lower polarizer can decrease the transmittance of the yellow light, thereby the color-cast problem of the back light can be ameliorated, the homogeneity of the color of the back light can be improved, and the display effect of the display device can be improved.

An embodiment of the present disclosure provides a backlight module, and a manufacturing method thereof, and a display device, the backlight module includes a backlight source, a light guide plate, at least one optical film, and a multilayer coating; and at least one side of the at least one optical film is provided with the multilayer coating; the multilayer coating is configured for decreasing light transmittance of at least one given wavelength; the backlight source is provided at a side of the light guide plate, and configured for providing white light, the light guide plate is configured for guiding the white light toward the optical film, and the white light is emitted out after transmitting through the optical film. Thereby the light transmittance of the at least one given wavelength can be decreased through providing the multilayer coating at at least one side of each optical film of the backlight module, for example, the transmittance of kinds of yellow light in the back light can be decreased, the problem that the overall color of a back light deviates to yellow because the blue light is overly-absorbed as the increasing of the propagation distance of the back light in the light guide plate can be avoided, the color of the back light can become homogeneous, and the overall display effect of the display device can be improved accordingly.

It is apparent that the presented disclosure can be modified by those skilled in the art without departure from the spirit and scope of the disclosure, if the above modification of the presented disclosure belongs to the scope of the claims of the presented disclosure and its equivalent technologies, the presented disclosure is intended to include the above modifications.

What are described above is related to the illustrative embodiments of the disclosure only and not limitative to the scope of the disclosure; the scopes of the disclosure are defined by the accompanying claims.

The application claims priority to the Chinese patent application No. 201610012626.3, filed Jan. 8, 2016, the entire disclosure of which is incorporated herein by reference as part of the present application.

What is claimed is:

1. A backlight module, comprising: a backlight source, a light guide plate, at least one optical film, and a multilayer coating; wherein,
    the multilayer coating is provided at at least one side of the at least one optical film;
    the multilayer coating is configured for decreasing light transmittance of at least one given wavelength;
    the backlight source is provided at a side of the light guide plate and configured for providing white light, the light guide plate is configured for guiding the white light toward the optical film, and the white light is emitted out after transmitting through the optical film;
    wherein a thickness of the multilayer coating is gradually increased in the direction, which is away from the backlight source, along the light guide plate, and the thickness of the multilayer coating corresponds to the light transmittance of the given wavelength.

2. The backlight module according to claim 1, wherein a material of the light guide plate is glass and the multilayer coating is configured for decreasing transmittance of yellow light.

3. The backlight module according to claim 2, wherein the multilayer coating is configured for gradually decreasing the transmittance of yellow light in a direction, which is away from the backlight source, along the light guide plate.

4. The backlight module according to claim 3, wherein the at least one optical film comprises any one of a diffuser film, a prism film or a reflective polarizer.

5. The backlight module according to claim 1, Wherein the optical film comprises a diffuser film, the diffuser film is provided at a light-emitting side of the light guide plate, and the multilayer coating is provided at a light-incident side of the diffuser film.

6. The backlight module according to claim 1, wherein the optical film comprises a prism film, the prism film is provided at a light-emitting side of the diffuser film, and the multilayer coating is provided at a light-incident side of the prism film.

7. The backlight module according to claim 1, wherein the optical film comprises a first prism film and a second prism film, the first prism film is close to the diffuser film, and
    the backlight module comprises two multilayer coatings, one of which is provided at a light-incident side of the first prism film, and the other of which is provided at a light-incident side of the second prism film.

8. The backlight module according to claim 7, wherein the optical film further comprises a reflective polarizer, and the backlight module further comprises another multilayer coating; and
    the reflective polarizer is provided at a light-emitting side of the second prism film, and the another multilayer coating is provided at a light-incident side and/or a light-emitting side of the reflective polarizer.

9. The backlight module according to claim 1, wherein the multilayer coating comprises a plurality of silicon dioxide layers and a plurality of titanium dioxide layers, and the plurality of silicon dioxide layers and the plurality of titanium dioxide layers are alternately provided.

10. A method of manufacturing a backlight module, comprising:
providing a backlight source, a light guide plate, and at least one optical film; and
forming a multilayer coating at at least one side of the at least one optical film;
wherein the multilayer coating is configured for decreasing light transmittance of at least one given wavelength;
the backlight source is provided at a side of the light guide plate and configured for providing white light, the light guide plate is configured for guiding the white light toward the optical film, and the white light is emitted out after transmitting through the optical film;
wherein a thickness of the multilayer coating is gradually increased in the direction, which is away from the backlight source, along the light guide plate, and the thickness of the multilayer coating corresponds to the light transmittance of the given wavelength.

11. The method of manufacturing the backlight module according to claim 10, wherein the multilayer coating is configured for decreasing transmittance of yellow light.

12. The method of manufacturing the backlight module according to claim 11, wherein the multilayer coating comprises a plurality of silicon dioxide layers and a plurality of titanium dioxide layers.

13. The method of manufacturing the backlight module according to claim 12, wherein forming of the multilayer coating at at least one side of the at least one optical film comprises:
alternately forming the plurality of silicon dioxide layers and the plurality of titanium dioxide layers at at least one side of the at least one optical film through a laminating process.

14. The method of manufacturing the backlight module according to claim 13, wherein the laminating process is a thermal evaporation process under a vacuum condition.

15. The method of manufacturing the backlight module according to claim 14, wherein,
a pressure of the thermal evaporation process is $10^{-6}$-$10^{-7}$ Pa;
a temperature for thermally evaporating silicon dioxide is higher than 150° C.; and
a temperature for thermally evaporating titanium dioxide is higher than 350° C.

16. The method of manufacturing the backlight module according to claim 15, wherein the temperature for thermally evaporating silicon dioxide is 150° C.-300° C.; and the temperature for thermally evaporating titanium dioxide is 350° C.-500° C.

17. A display device, comprising:
the backlight module according to claim 1, and
a liquid crystal display panel,
wherein, the backlight module is configured for providing back light for the liquid crystal display panel for display.

18. The display device according to claim 17, further comprising a lower polarizer and an upper polarizer respectively provided at a light-incident side and a light-emitting side of the display panel, and a second multilayer coating layer,
wherein, the second multilayer coating layer is provided at a light-incident side of the lower polarizer.

* * * * *